(12) United States Patent
Ogata

(10) Patent No.: US 7,151,737 B2
(45) Date of Patent: *Dec. 19, 2006

(54) OPTICAL HEAD AND OPTICAL DISC APPARATUS FOR FOCUSING A COLLIMATED LASER BEAM

(75) Inventor: Daisuke Ogata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 186 days.

This patent is subject to a terminal disclaimer.

(21) Appl. No.: 10/891,186

(22) Filed: Jul. 15, 2004

(65) Prior Publication Data

US 2004/0264344 A1 Dec. 30, 2004

Related U.S. Application Data

(63) Continuation of application No. 09/969,774, filed on Oct. 4, 2001, now Pat. No. 6,781,945.

(30) Foreign Application Priority Data

Oct. 13, 2000 (JP) .............................. 2000-313475

(51) Int. Cl.
G11B 7/00 (2006.01)
(52) U.S. Cl. ............................................... 369/112.23
(58) Field of Classification Search ........... 369/112.23, 369/112.01; G11B 7/00
See application file for complete search history.

(56) References Cited

U.S. PATENT DOCUMENTS 5,477,386 A * 12/1995 Okuda et al. ............... 359/669
5,825,555 A  10/1998 Oono et al. ................. 359/668
5,978,148 A  11/1999 Oono et al. ................. 359/668
5,991,102 A  11/1999 Oono et al. ................. 359/820
6,052,236 A   4/2000 Nakasuji et al.
6,134,197 A  10/2000 Ishibashi et al.
6,154,433 A  11/2000 Hoshino et al. ........ 369/112.04
6,876,622 B1 * 4/2005 Nishi .................... 369/112.21

FOREIGN PATENT DOCUMENTS

JP  3086937  4/1991
JP  2933325  5/1999

* cited by examiner

*Primary Examiner*—A M Psitos
(74) *Attorney, Agent, or Firm*—Wenderoth, Lind & Ponack, L.L.P.

(57) ABSTRACT

An optical head includes a laser source (11) irradiating the laser beam having a wavelength not longer than 500 nm, a collimator lens (13) for collimating the laser beam to the parallel rays, an optical beam shaping system (14, 15) that adjusts the cross sectional shape of the beam from the collimator lens, and an objective lens (16) that converges the beam on an optical information medium. The optical head has a relationship between a focal length $f_{CL}$ of the collimator lens and a magnification M of beam shaping satisfies the following equation:

$$A_{SO} \geq \left(\frac{C}{f_{CL}}\right)^2 \arcsin\left[\sqrt{\frac{(M-1)}{(n^2 M-1)}}\right]$$

in which C is a constant in $(\lambda \cdot \text{mm})^{1/2}$, $A_{so}$ is a maximum astigmatism per displacement of the collimator lens from the focal position, and n is a refractive index of a member of optical beam shaping system.

4 Claims, 6 Drawing Sheets

MAGNIFICATION OF BEAM SHAPING

OPTICAL HEAD AND OPTICAL DISC APPARATUS FOR FOCUSING A COLLIMATED LASER BEAM

This application is a continuation of U.S. application Ser. No. 09/969,774, filed Oct. 4, 2001, now U.S. Pat. No. 6,781,945, issued on Aug. 24, 2004.

BACKGROUND OF THE INVENTION

1. Field of the Invention

The present invention relates to an optical head that focuses a beam irradiated from the light source in an information recording surface of an optical disc through a transparent base plate on the recording surface to record and reproduce an information signal on and from the recording surface.

2. Description of the Prior Art

Generally, in an optical disc system optical head that focuses a beam irradiated from the light source in an information recording surface of an optical disc through a transparent base plate on the recording surface, an information signal is recorded on or reproduced from the recording surface. The spot size of the beam on the recording surface is preferably small enough to obtain a good property for recording and reproducing.

The more homogeneous is the strength of the beam being incident on an objective lens, the smaller the spot size is tightened. However, the light irradiated from a semiconductor laser used as a laser source for the optical head generally has a Gaussian distribution intensity. Therefore, the truncation of the objective lens is increased to render the optical intensity at effective radius of the objective lens to be close to the center intensity, so that the beam intensity distribution can become homogeneous, as shown in FIG. 1. In FIG. 1, the horizontal line represents rim intensity, i.e., the ratio of the optical intensity at effective radius of the objective lens to the center optical intensity, and the vertical line represents the spot size, which is 1 when the rim intensity is 0 (zero). Referring to FIG. 1, the higher the rim intensity is, that is, the larger the truncation of the objective lens becomes, the smaller the spot size is tightened. The rim intensity depends on the size of the incident beam against the effective radius of the objective lens. In this optical system wherein the beam from the light source is collimated into parallel rays by a collimator lens and the parallel rays are subsequently incident on the objective lens, the size of incident beam is proportional to a focal length of the collimator lens. Therefore, the focal length will be determined so as to obtain the desired rim intensity with the objective lens.

The cross section of the spot can not become a true circle, where the rim intensity changes in a circumferential direction, since the rim intensity and the spot size have such a relationship as shown in FIG. 1. The Intensity distribution of the irradiation ray in a horizontal direction parallel to the junction face of the semiconductor laser differs from the intensity distribution of the irradiation ray in a vertical direction orthogonal thereto, so far as the Gaussian distribution of the irradiation ray is concerned. If the angle of full width at half maximum (hereinafter called as F.W.H.M.) in the horizontal direction and that in the vertical direction is expressed by $\theta_{h1}$, and $\theta_{v1}$ respectively, the ratio $\theta_h/\theta_v$ is generally within the range from ½ to ⅓ and, therefore, the cross sectional shape of the beam becomes a long ellipse in the vertical direction. When the elliptic beam is converged by the objective lens, the rim intensity in the horizontal direction becomes lower than that in the vertical direction, and the shape of a beam spot on the surface of the optical disc becomes an ellipse, which has a spot size in the horizontal direction that is larger than in the vertical direction. If it is necessary to rectify the elliptic beam spot to become a beamspot of a true circle, an optical beam shaping system that closes the beam size in the horizontal direction with the beam size in the vertical direction is used. For example, two prisms may be used as the optical beam shaping system as shown in FIG. 2. Referring to FIG. 2, a beam 12 is irradiated from a semiconductor laser 11, and is then collimated to parallel rays by a collimator lens 13 before the collimated beam 12 is successively transmitted through a prism 14 and a prism 15. The prism 14 magnifies the beam size from $D_1$ to $D_2$ on a plane parallel to the surface of the paper, but does not magnify the beam on the plane perpendicular to the surface of the paper. Note that the prism 15 magnifies the beam size from $D_2$ to $D_3$ as shown in FIG. 2, however, the magnification ratio $D_3/D_2$ of the prism 15 is as well as the ratio $D_2/D_1$ of the prism 14. Therefore, adjusting the horizontal direction of the junction plane of the semiconductor laser 11 to become parallel to the surface of the paper results in beam shaping. The magnification may be determined in order to obtain a desired spot shape.

As above mentioned, it is preferable to shape and extend the focal length of the collimator lens for the optical head. However, the collimator lens acts to increase the amount of the beam fluxes vignetted to thereby decrease the efficiency of utilization of the beam. Considering the rim intensity and the efficiency of utilization of the beam, a feasibly balanced combination of the focal length of the collimator lens 13 and the magnification of the prism should be selected. This effect will be explained with reference to FIG. 3. In FIG. 3, the horizontal line represents the magnification of beam shaping and the vertical line represents the focal length $f_{CL}$ of the collimator lens. In the example shown in FIG. 3, the angle of F.W.H.M. in the horizontal direction and that in the vertical direction are $\theta_h=11°$ and $\theta_v=27°$, respectively. The effective radius of the objective lens is 3.4 mm. Referring to FIG. 3, the curve A is in the case of the 35% rim intensity in the horizontal direction, the curve B is in the case of the 40% rim intensity in the vertical direction, and the curve C is in the case of the efficiency $\eta=45\%$ of utilization of the beam.

According to the above principle, the above curve A and curve B, and below curve C, is indicated by hatching in FIG. 3. If a combination of the focal length $f_{CL}$ and the magnification M of beam shaping is selected from the area, then the combination can satisfy the condition of the 35% rim intensity in the horizontal direction, the 40% rim intensity in the vertical direction, and the 45% efficiency of utilization of the beam. When the magnification M of beam shaping is lower than 2.5, the cross sectional shape of the collimated rays cannot become a true circle. Referring to FIG. 1, however, because the spot size will change a small amount at a rim intensity larger than 20% or 30%, the optical head having a good performance can be provided.

By the way, in the optical beam shaping system as shown in FIG. 2, an astigmatism will be caused, when the beam being incident on prism 14 and 15 is not parallel rays. When the semiconductor laser 11 is displaced from the focal point of the collimator lens 13, the beam may not be parallel rays, so that the astigmatism will be caused. FIG. 4 shows a simulation of relationship between a displacement of the laser source and the astigmatism. The semiconductor laser source irradiates a laser having a wavelength 650 nm, and an angle of F.W.H.M. $\theta_h=11°$ in the horizontal direction and $\theta_v=27°$ in the vertical direction, respectively. The magnification M of beam shaping is 2.5, and the focal length $f_{CL}=8.0$ mm. Referring to FIG. 4, the astigmatism is proportional to the displacement of the laser source, and the proportional coefficient is 5.7 m$\lambda$/$\mu$m. If the astigmatism is 30 m$\lambda$, in order to have no influence against recording and reproducing the signal, the maximum permissible displacement will be about 5.3 $\mu$m. An interval between the laser source and the collimator lens may change with temperature. Assuming that a base stand supporting the optical member is made of an aluminum alloy, and a temperature range $\Delta T$ in which the performance of an optical head is warranted is $\Delta T=\pm 30$ degrees, the displacement $\Delta Z$ of the interval can be estimated as follows.

$$\Delta Z = f_{CL} \cdot \Delta T \cdot \alpha = 5.3 \; \mu m$$

Note that $\alpha$ is an expansion coefficient of the aluminum alloy which is $2.3 \times 10^{-5}$ degree$^{-1}$. The displacement $\Delta Z$ may be equal to the maximum permissible displacement, and therefore we consider the astigmatism caused by temperature shift may be permitted.

In this case of the wavelength of about 650 nm, the good spot size and the good efficiency of utilization of the beam can be compatible and the astigmatism of the optical beam shaping system can be in the permissible range.

Recently, the short wavelength laser source having a wavelength not longer than 500 nm is developed to realize the optical disc having a high density recording. When the short wavelength laser source is used in the optical head system, the wave front aberration is inversely proportional to the wavelength, then the astigmatism will be made larger than at a wavelength of about 650 nm. For example, when a semiconductor violet laser having a wavelength 400 nm is used, the astigmatism will be about 1.6 times as large as at wavelength of 650 nm. Therefore, the maximum permissible displacement $\Delta Z$ of interval between the source and the collimator lens will be 0.6 times lower than at a wavelength of 650 nm. When beam shaping is performed on the same condition, the astigmatism caused by the displacement of the interval between the source and the collimator lens, and then particularly, the recording and reproducing performance will be remarkably dropped due to the temperature shift.

Japanese Patent No. 2,933,325 shows the beam shaping system, which adjusts a location of the collimator lens by positively making use of the displacement of the interval between the source and the collimator lens, so that the astigmatism can be compensated for. However, this system can be applied to only stable astigmatism, the variable astigmatism due to temperature shift can not be cancelled by this system. If a drive system of the collimator lens in the optical axis will be provided, then temperature shift may be compensated, but this will result not only in increase of the number of members, but also the necessity of both a servo circuit for controlling the location of the lens and a studying program for adjusting the lens.

SUMMARY OF THE INVENTION

Therefore, it is an object of the present invention to provide an optical head using a laser having a wavelength not longer than 500 nm, which maintains the recording and reproducing performance, and good temperature property.

In accordance with one aspect of the present invention, there is provided an optical head including a laser source, a collimator lens, an optical beam shaping system, and an objective lens. The laser source irradiates the laser beam having a wavelength not longer than 500 nm. The collimator lens collimates the laser beam to a beam having parallel rays. Additionally, the optical beam shaping system adjusts the cross sectional shape of the beam from the collimator lens. The objective lens converges the beam on an optical information medium. Then, the optical head has a relationship between a focal length $f_{CL}$ of the collimator lens and a magnification M of beam shaping that satisfies the following equation.

$$A_{SO} \geq \left(\frac{C}{f_{CL}}\right)^2 \arcsin\left[\sqrt{\frac{(M-1)}{(n^2 M - 1)}}\right]$$

Note that C is a constant in $(\lambda \cdot mm)^{1/2}$, $A_{so}$ is a maximum astigmatism per displacement of the collimator lens from the focal position, and n is a refractive index of a member of optical beam shaping system.

The constant C may be no smaller than 29 and no greater than 33 in $(\lambda \cdot mm)^{1/2}$.

The optical beam shaping system may include a prism. Preferably, the system may include two prisms.

The relationship between the focal length $f_{CL}$ and the magnification M may satisfy the following three equations A, B, and C.

$$M \cdot f_{CL} \geq \frac{R_{OL}}{\sin\frac{\theta_h}{2}} \sqrt{-\frac{\ln 2}{\ln(I_{rim \cdot h})}} \quad (A)$$

Note that M is the magnification of beam shaping prism, $f_{CL}$ is the focal length of the collimator lens, $R_{OL}$ is an effective radius of the objective lens, $\theta_h$ is the angle of F.W.H.M. in the horizontal direction, and $I_{rim \cdot h}$ is the rim intensity of the beam in the horizontal direction.

$$f_{CL} \geq \frac{R_{OL}}{\sin\frac{\theta_v}{2}} \sqrt{-\frac{\ln 2}{\ln(I_{rim \cdot v})}} \quad (B)$$

Note that $\theta_v$ is the angle of F.W.H.M. in the vertical direction, and $I_{rim \cdot v}$ is the rim intensity of the beam in the vertical direction.

$$\eta \geq \frac{2}{\pi \cdot R_h R_v} \int\int_S \exp\left[-2\left\{\left(\frac{x}{R_h}\right)^2 + \left(\frac{y}{R_v}\right)^2\right\}\right] dx dy \quad (C)$$

Note that $\eta$ is an efficiency of utilization of the beam, and Rh and Rv are 11e$^2$ effective radius of the Gaussian distribution in the horizontal direction and in the vertical direction, respectively, and are indicated as following equations.

$$R_h = \sqrt{\frac{2}{\ln 2}} \, M \cdot f_{CL} \sin\frac{\theta_h}{2}$$

$$R_v = \sqrt{\frac{2}{\ln 2}} \, f_{CL} \sin\frac{\theta_v}{2}$$

Preferably, the rim intensity of the beam in the horizontal direction may be 0.35, the rim intensity of the beam in the vertical direction may be 0.40, and the efficiency of utilization of the beam may be 0.45.

In a further aspect of the present invention, there is provided an optical disc apparatus including a laser source, a collimator lens, an optical beam shaping system, an objective lens, an optical detector, and a signal-processor. The laser source irradiates the laser beam having a wavelength not longer than 500 nm, and the collimator lens collimates the laser beam to the parallel rays. Then, the optical beam shaping system adjusts the cross sectional shape of the beam from the collimator lens. Additionally, the objective lens converges the beam on an optical information medium. The optical detector outputs current due to an optical beam reflected by the surface of the information medium. The signal processor processes the current from the optical detector and picks up the desired signal from the signal. Then the optical disc apparatus has a relationship between a focal length $f_{CL}$ of the collimator lens and a magnification M of beam shaping that satisfies the following equation.

$$A_{SO} \geq \left(\frac{C}{f_{CL}}\right)^2 \arcsin\left[\sqrt{\frac{(M-1)}{(n^2M-1)}}\right]$$

Note that C is a constant in $(\lambda \cdot mm)^{1/2}$, $A_{so}$ is a maximum astigmatism per displacement of the collimator lens from the focal position, and n is a refractive index of a member of optical beam shaping system.

According to the optical head of the present invention, except for the rim intensity condition and the efficiency of utilization condition, the new equation limiting the astigmatism caused in the optical beam shaping system is used to select a combination of the magnification of beam shaping and the focal length of the collimator lens. Therefore, the optical head having the good performance in recording and reproducing at a wavelength not longer than 500 nm, at which the astigmatism should be restricted, can be provided.

DETAILED DESCRIPTION OF THE PREFERRED EMBODIMENTS

In the prior art optical head, a combination of the magnification of beam shaping and the focal length of the collimator lens is selected according to the rim intensity and the efficiency of utilization to obtain the good spot size.

In the first embodiment of this invention, when a laser source has a wavelength not longer than 500 nm, a new equation for limiting the astigmatism is added to the above 3 equations. The new equation expresses a relationship between the magnification M of beam shaping, the focal length of the collimator lens, and the astigmatism. A combination of the magnification and the focal length is selected from the area, where the equations A and B with respect to the rim intensity, the equation C with respect to the efficiency of utilization and the new equation may be compatible, so that a good recording and reproducing performance can be compatible at a wavelength of 500 nm.

The astigmatism of the optical system of the optical head is caused by non-parallel beam being incident on the prism. When the beam shaping is not performed, that is, magnification of beam shaping becomes 1, then no astigmatism is caused and, therefore, the astigmatism is increased dependent on the magnification of beam shaping. Then, the new equation with respect to the astigmatism can be arrived by the above relationship.

Figure 5:
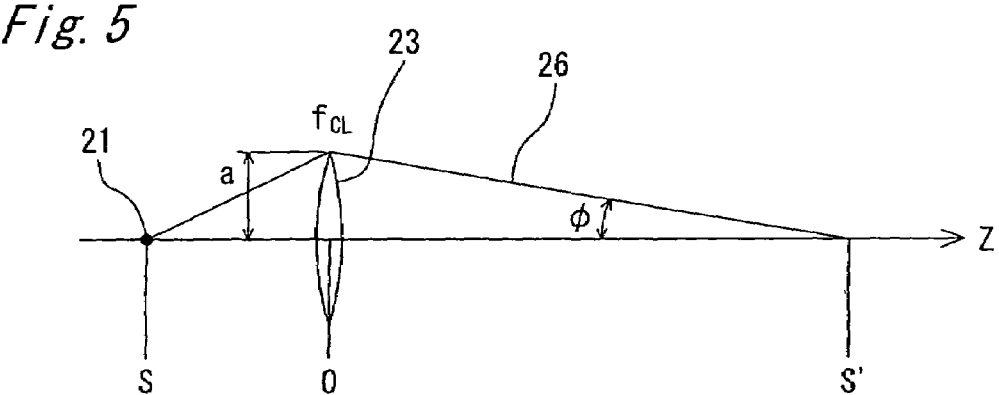
FIG. 5 is a schematic graph that shows a locus of ray through the collimator lens.

FIG. 5 shows the relationship between the displacement of interval between the source and the collimator lens, and the parallel level of focused beam. FIG. 5 is a schematic diagram that shows the imaging rule of the lens. In FIG. 5, the location of the principle point of the collimator lens 23 is made the origin O of the coordinates, and the laser irradiating direction is made the z axis of the coordinates. Then, the coordinates S indicates the semiconductor laser source 21, and the coordinates S' indicates the crossing point, at which the z axis and the rays passing through the outer edge of effective radius (a) of the collimator lens 23 are intersected. Therefore, the imaging rule arrives at the following equation (1).

$$\frac{1}{S'} - \frac{1}{S} = \frac{1}{f_{CL}} \quad (1)$$

Now, the displacement of the semiconductor laser 21 may be in the order of several micrometers, and may be only in the order of 1/1000 times the focal length of the collimator lens 23, and then the coordinates S' as shown in the equation (1) is well far from the origin O, so that the angle φ among the rays 26 and the z axis can be approximated to the following equation (2).

$$\phi = \frac{a}{S'} \quad (2)$$

Then, substituting the equation (2) into the equation (1), and differentiating by variable S, and then putting in order, the equation (3) can be obtained.

$$\frac{d\phi}{dS} = -\frac{a}{S^2} \quad (3)$$

After transmitting through the collimator lens 23, the beam passing through the optical beam shaping system caused the astigmatism Wa. The astigmatism is proportional to the angle φ, and a constant k is used, and then the astigmatism Wa can be indicated at following equation (4).

$$\frac{d(Wa)}{dS} = k \cdot \frac{d\phi}{dS} = -ka \cdot S^2 \quad (4)$$

The left side of the equation (4) indicates the astigmatism As per the displacement of the interval between the source and the collimator lens. The astigmatism As is the aberration per the displacement from the arrangement, at which the semiconductor laser source 21 is located on the focal point of the collimator lens 23, and then the relationship $S=-f_{CL}$ can be substituted in the equation (4). Then the equation (5) can be obtained. Note that $C_1$ is constant.

$$A_S = \frac{d(Wa)}{dS} = \frac{C_1}{f_{CL}^2} \quad (5)$$

Figure 1:
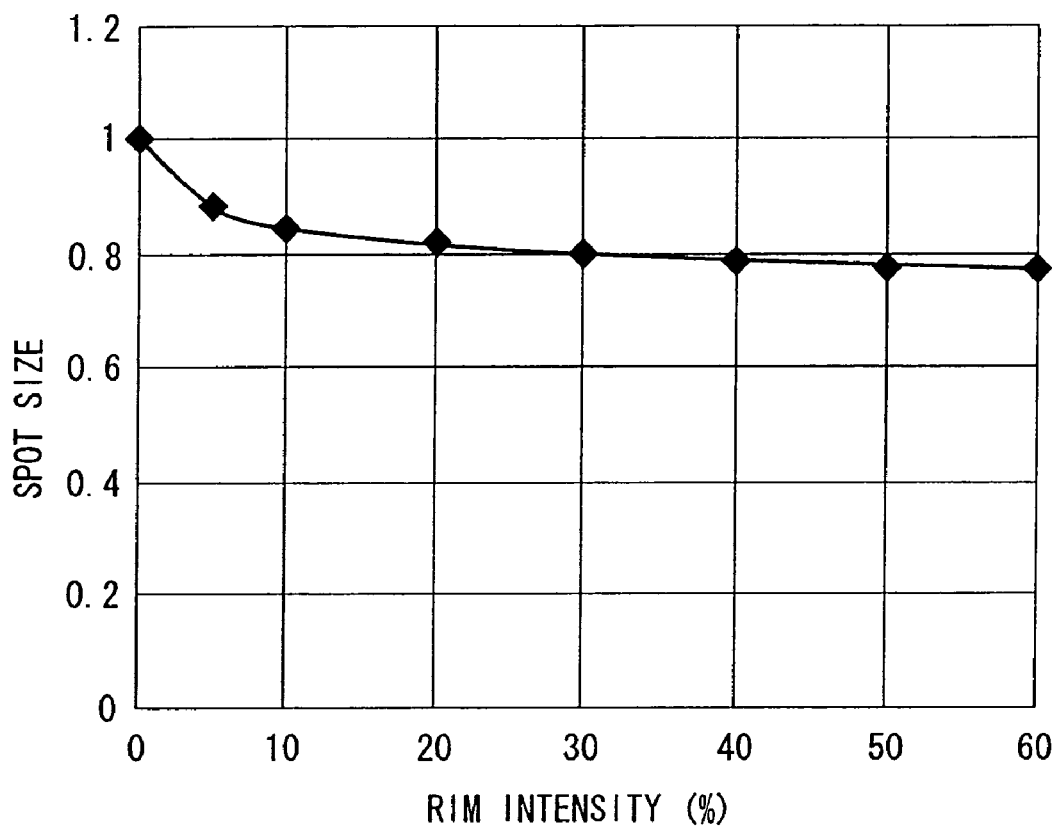
FIG. 1 is a graph that shows a relationship between rim intensity of optical head and spot size.
Figure 2:
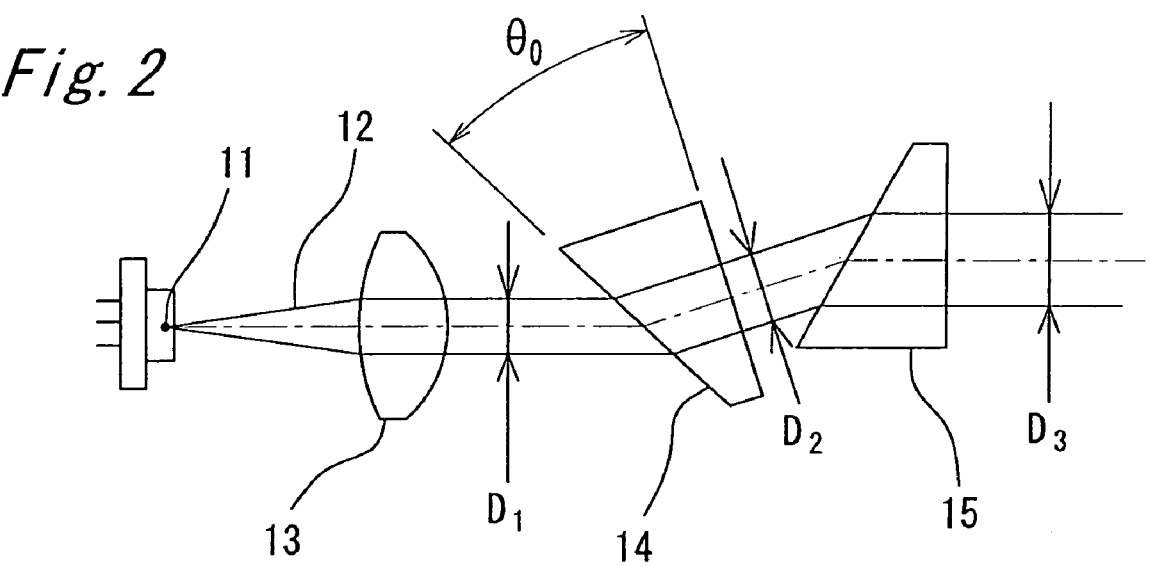
FIG. 2 is a block diagram of a optical beam shaping system by prism.

The relationship between the magnification of beam shaping and the astigmatism will be explained hereunder. In FIG. 2, according to the Snell's law and the geometric relation, the relationship between the radius $D_1$ of the beam inputting to the prism, the radius $D_2$ of the beam outputting from the prism, and the vertical angle $\theta_0$ of the prism can be expressed in following equation (6).

$$\sin\theta_0 = \sqrt{\frac{\left\{\left(\frac{D_2}{D_1}\right)^2 - 1\right\}}{\left\{n^2\left(\frac{D_2}{D_1}\right)^2 - 1\right\}}} \quad (6)$$

In this case, the two same prisms 14, 15 are coupled, the magnification of the prism 14 is about $D_2/D_1$, and the magnification of the prism 15 is $D_3/D_2$ that is equal to $D_2/D_1$, and then total magnification M is $(D_2/D_1)*(D_3/D_2)$, as shown in FIG. 2. Therefore, the total magnification M of beam shaping is indicated as $(D_2/D_1)^2$, and, on the contrary, $(D_2/D_1)^2$ can be replaced to the magnification M. The astigmatism As caused in the prism is proportional to the vertical angle $\theta_0$, and then the equation (6) can be put in order with use of constant $C_2$.

$$A_S = C_2 \arcsin\left[\sqrt{\frac{(M-1)}{(n^2M-1)}}\right] \quad (7)$$

The equation (5) and the equation (7) are combined, and then the equation (8) can be obtained with use of a constant C.

$$A_S = \left(\frac{C}{f_{CL}}\right)^2 \arcsin\left[\sqrt{\frac{(M-1)}{(n^2M-1)}}\right] \quad (8)$$

The equation (8) indicates the astigmatism As per the displacement of the interval between the source and the lens, which is caused by specific combination of the magnification M of beam shaping and the focal length $f_{CL}$ of the collimator lens. Therefore, the combination of the magnification M of beam shaping and the focal length $f_{CL}$ of the collimator lens should be selected to satisfy the following equation (9), so that the astigmatism can be not more than the desired astigmatism $A_{s0}$.

$$A_{SO} \ge \left(\frac{C}{f_{CL}}\right)^2 \arcsin\left[\sqrt{\frac{(M-1)}{(n^2M-1)}}\right] \quad (9)$$

The equation (9) indicates the necessary condition, by which the astigmatism caused by the displacement of the interval between the source and the collimator lens can be controlled to not more than the desired value. The new limiting equation with respect to the astigmatism is added to prior art the rim intensity condition and the efficiency of utilization condition, and then the optical system having a good performance in recording and reproducing with use of the laser source having a wavelength not longer than 500 nm can be obtained.

Figure 6:
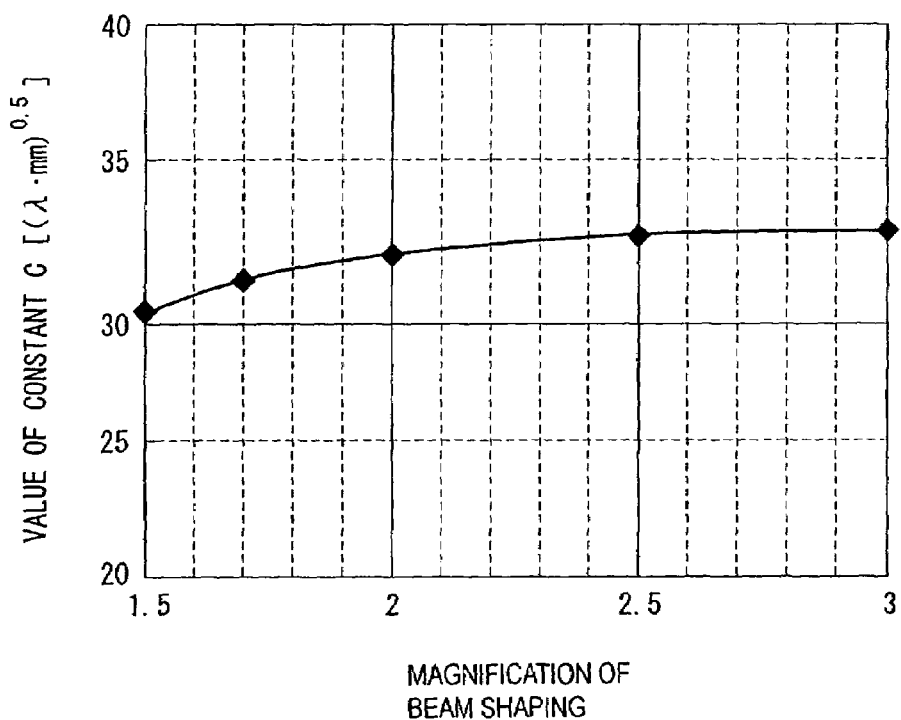
FIG. 6 is a graph that shows a relationship between a value of constant C and a magnification of beam shaping.

In the practical case of the focal length 6–9 mm of the collimator lens and the magnification 1.5–3.0 of beam shaping, the astigmatism per the displacement of the interval between the source and the lens is obtained with use of the ray-tracing method, and then the constant C can be obtained by the equation (8). For example, in the case of a source having a wavelength 405 nm and a prism having a refractive index n of 1.5297, the effect is indicated in FIG. 6. Referring to FIG. 6, the constant C may be within the range from 29 to 33 in $(\lambda \cdot mm)^{1/2}$. Therefore, the constant C will be determined in the above range, then the combination of the magnification M and the focal length $f_{CL}$ should be selected.

Figure 3:
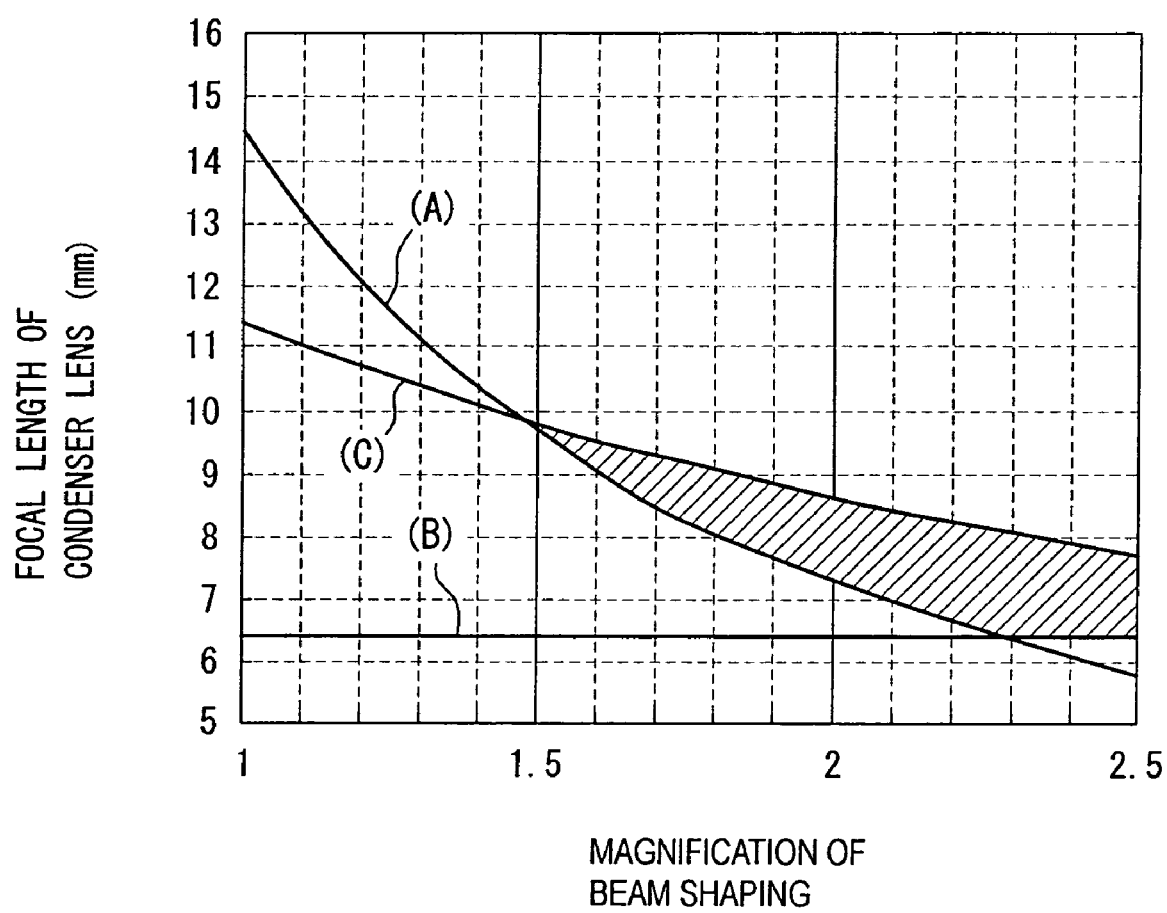
FIG. 3 is a graph that shows a relationship between magnification of beam shaping and focal length of collimator lens.
Figure 4:
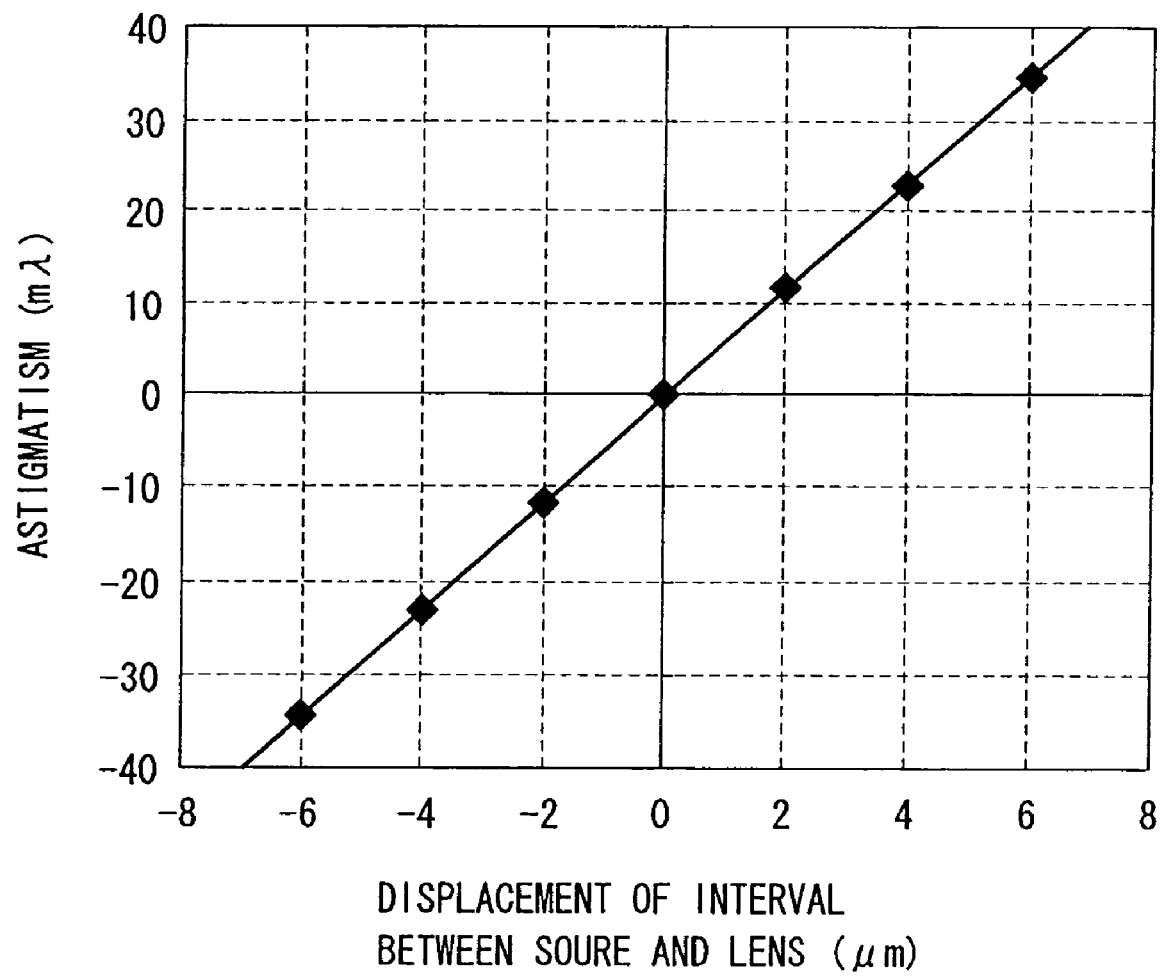
FIG. 4 is a graph that shows a relationship between astigmatism and displacement of interval between light source and collimator lens.
Figure 7:
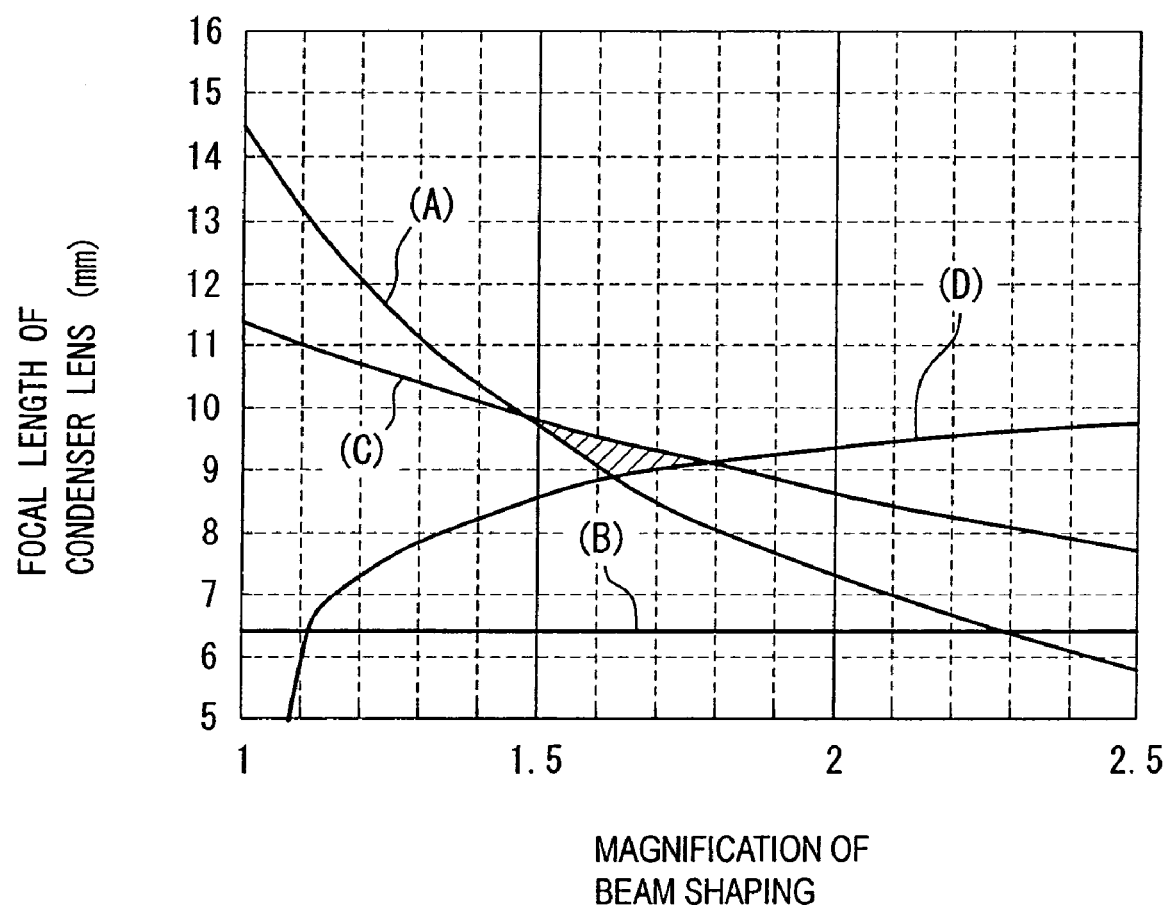
FIG. 7 is a graph that shows a method of selecting a pair of magnification of beam shaping and focal length of collimator lens.

FIG. 7 shows a selectable area. FIG. 7 is a same graph of FIG. 3 but the curve D added. The curve D as shown in FIG. 7 indicates the equation (8), and C is 31 $(\lambda \cdot mm)^{1/2}$, the astigmatism As is 6 m$\lambda$/$\mu$m as well as at a wavelength 650 nm. Additionally, the source wavelength is 405 nm, and the refractive index n of the prism is 1.5297. Referring to FIG. 7, the equation (9) indicates the selectable area is above the curve D. Additionally, referring to FIG. 7, the curve A is in the case of the 35% rim intensity in the horizontal direction, the curve B is in the case of the 40% rim intensity in the vertical direction, and the curve C is in the case of the efficiency $\eta=45\%$ of utilization of the beam. For example, the curve A is indicated at the following equation.

$$M \cdot f_{CL} \ge \frac{R_{OL}}{\sin\frac{\theta_h}{2}} \sqrt{-\frac{\ln 2}{\ln(I_{rim \cdot h})}} \quad (A)$$

Note that M is a magnification of prism for beam shaping, $f_{CL}$ is a focal length of the collimator lens, $R_{OL}$ is an effective radius of the objective lens, $\theta_h$ is the angle of F.W.H.M. in the horizontal direction, and $I_{rim.h}$ is the rim intensity of the beam in the horizontal direction.

The curve B is indicated at the following equation.

$$f_{CL} \ge \frac{R_{OL}}{\sin\frac{\theta_v}{2}} \sqrt{-\frac{\ln 2}{\ln(I_{rim \cdot v})}} \quad (B)$$

Note that $\theta_v$ is the angle of F.W.H.M. in the vertical direction, and $I_{rim.v}$ is the rim intensity of the beam in the vertical direction.

The curve C is indicated at the following equation.

$$\eta \geq \frac{2}{\pi \cdot R_h R_v} \int\int_S \exp\left[-2\left\{\left(\frac{x}{R_h}\right)^2 + \left(\frac{y}{R_v}\right)^2\right\}\right] dx dy$$

Note that $\eta$ is efficiency of utilization of the beam, Rh and Rv are $1/e^2$ effective radius of the Gaussian distribution in the horizontal direction and in the vertical direction, respectively, and is indicated as follows.

$$R_h = \sqrt{\frac{2}{\ln 2}} \; M \cdot f_{CL} \sin\frac{\theta_h}{2}$$

$$R_v = \sqrt{\frac{2}{\ln 2}} \; f_{CL} \sin\frac{\theta_v}{2}$$

Therefore, the combination of the magnification M and the focal length $f_{CL}$ may be selected from the area enclosed by the four curves A to D as shown in FIG. 7, so that the optical system having a rim intensity not lower than 35% in the horizontal direction, a rim intensity not lower than 40% in the vertical direction, an efficiency of utilization not lower than 45%, and an astigmatism not more than 6 m$\lambda$/$\mu$m can be provided. Therefore, both the desired rim intensity and desired efficiency of utilization can be compatible, even though the astigmatism is maintained as well as at the wavelength 650 nm.

It is noted that the curve A (equation A) and the curve B are obtained in the following steps. The rim intensity $I_{rim.h}$ in the horizontal direction and $I_{rim.v}$ in the vertical direction are indicated by the following equations, respectively.

$$I_{rim.h} = \exp\left[-2\left(\frac{R_{OL}}{R_h}\right)^2\right] \quad \text{(pre-A)}$$

$$I_{rim.v} = \exp\left[-2\left(\frac{R_{OL}}{R_v}\right)^2\right] \quad \text{(pre-B)}$$

Note that Rh and Rv are $1/e^2$ effective radius of the Gaussian distribution in the horizontal direction and in the vertical direction, respectively, and are indicated in the following equations.

$$R_h = \sqrt{\frac{2}{\ln 2}} \; M \cdot f_{CL} \sin\frac{\theta_h}{2}$$

$$R_v = \sqrt{\frac{2}{\ln 2}} \; f_{CL} \sin\frac{\theta_v}{2}$$

Then, the above equations pre-A and pre-B are transformed to show a relationship between the magnification M and the focal length $f_{CL}$, and then the equations A and B can be obtained.

Additionally, it is noted that the Rh and Rv are obtained as following steps. In this case, the beam has the angle of F.W.H.M. $\theta_h$ in the horizontal direction and the angle of F.W.H.M. $\theta_v$ in the vertical direction. Before beam shaping, the radius of F.W.H.M. $r_h$ in the horizontal direction and the radius of F.W.H.M. $r_v$ in the vertical direction are indicated as following equations respectively.

$$r_h = f_{CL} \sin\frac{\theta_h}{2}$$

$$r_v = f_{CL} \sin\frac{\theta_v}{2}$$

Then, after beam shaping with magnification M in the horizontal direction, the radius of F.W.H.M. $r_h'$ in the horizontal direction and the radius of F.W.H.M. $r_v'$ in the vertical direction are indicated by the following equations, respectively.

$$r_h' = M \cdot r_h = M \cdot f_{CL} \sin\frac{\theta_h}{2}$$

$$r_v' = r_v$$

In the Gaussian distribution, multiplying the radius of F.W.H.M. $r_h'$ and $r_v'$ by $(2/\ln 2)^{1/2}$, and then the $1/e^2$ effective radius $R_h$ in the horizontal direction and $R_v$ in the vertical direction are obtained as following equations.

$$R_h = \sqrt{\frac{2}{\ln 2}} \cdot r_h' = \sqrt{\frac{2}{\ln 2}} \; M \cdot f_{CL} \sin\frac{\theta_h}{2}$$

$$R_v = \sqrt{\frac{2}{\ln 2}} \cdot r_v' = \sqrt{\frac{2}{\ln 2}} \; f_{CL} \sin\frac{\theta_v}{2}$$

By the way, referring to FIG. 6, we consider that the constant C may be dependent on the magnification M. The shift of the constant C due to the shift of the magnification M is small and, therefore, the shift of the constant C may practically not effect selection in FIG. 7. When precision is needed, preferably, the constant C may be expressed as the function of the magnification M, and then the function is substituted in the equation (9), so that the effect can be obtained. The following equations may be used as the above function.

$$C = 33\{1 - \exp(-1.5M)\} \tag{10}$$

$$C = 32.5 - 0.6(M-3)^4 \tag{11}$$

In the above optical system, two prisms are used as the optical beam shaping system, as shown in FIG. 2. However, a prism can be used as the optical beam shaping system. The astigmatism obtained by the ray-tracing method may be equal whether the optical system includes one prism or two prisms, so that the above conditions can be used in the optical system having one prism. Generally, discriminating the refractive effects in the horizontal direction and in the vertical direction, then the beam shaping effect is obtained and, therefore, the mechanism of the astigmatism may be similar regardless the method of beam shaping. Consequently, the present invention may be applied to the generally optical beam shaping system with use of other system except for the prism.

Figure 8:
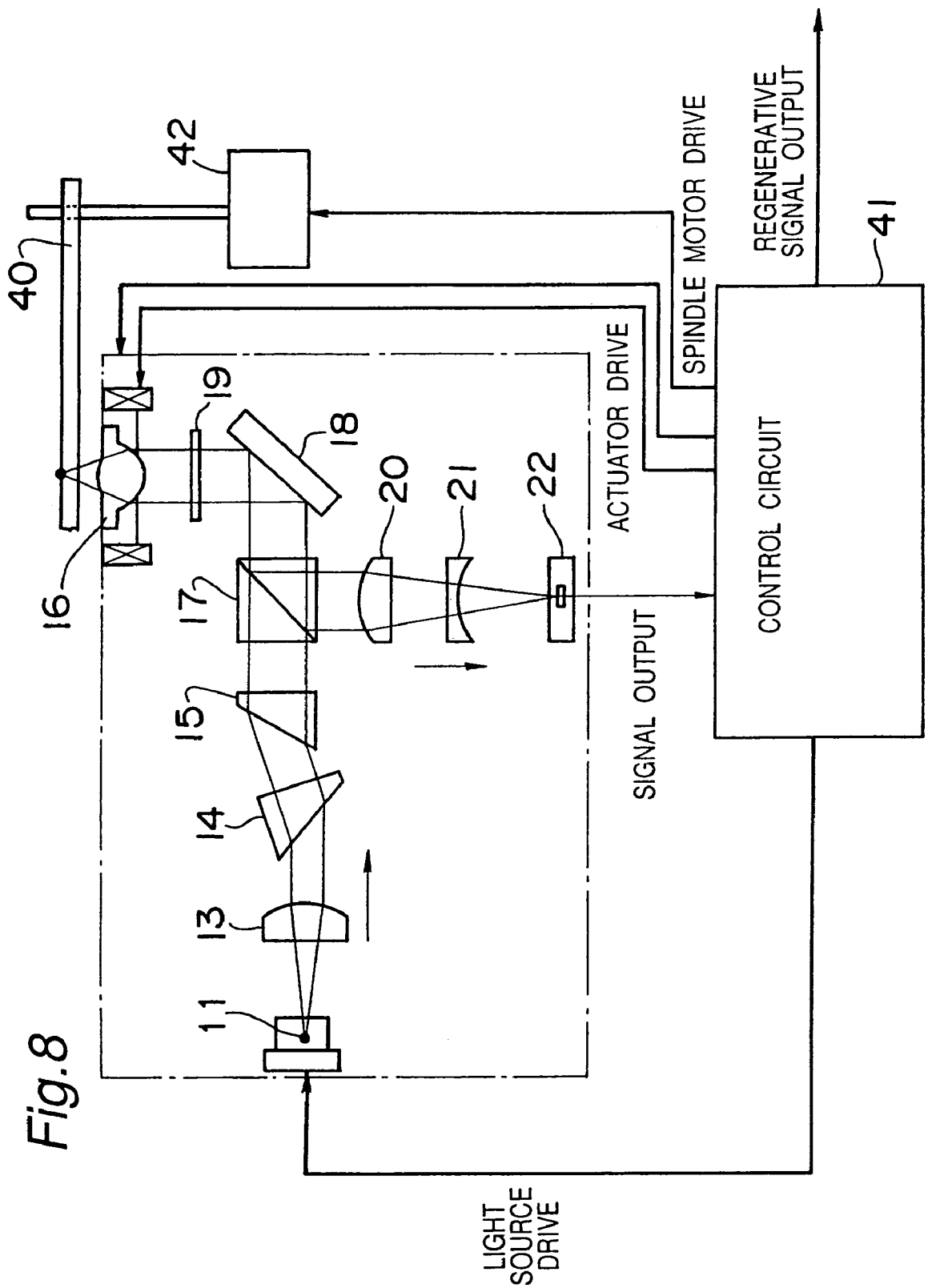
FIG. 8 is a block diagram of an apparatus that reproduces an optical signal.

FIG. 8 shows an optical disc apparatus having the optical head above mentioned. The optical disc apparatus, for example, may be an optical information system reproducing a compact disc or a digital versatile disc. In this optical head, the laser beam is irradiated from the semiconductor laser source 11. The laser beam is collimated to parallel rays by the collimator tens 13, and passes through the prisms 14, 15 to be formed, and passes through the beam splitter 17, and is reflected by the miller 18, passes through the quarter wave plate 19, and then forms a small spot on the optical disc 40 by the objective lens 16. The reflected laser beam from the optical disc 40 passes through the quarter-wave plate 19 and the objective lens 16, and is reflected by the miller 18, and is reflected by the beam splitter 17, and passes through the detecting lens 20 and cylindrical lens 21 and then is detected by the photo-detector 22. The control circuit 41 controls the laser source 11 to irradiate the laser, and drives the spindle motor 42 to rotate the optical disc 40 according to the electrical signal from the photo-detector 22, drives the actuator to control the focus of the objective lens 16, and then drives the actuator to control the tracking on the optical disc 40. Then, the electric signal is outputted from the recording signal on the optical disc 40 to external. Note that the control system may be similar to prior art optical disc apparatus and the detailed explanation is not therefore reiterated. The present disclosure relates to subject matter contained in priority Japanese Patent Application No. 2002-313475, filed Oct. 13, 2000, the contents of which is herein expressly incorporated by reference in its entirety.

What is claimed is:

1. An optical head comprising:
   a laser source for irradiating a laser beam having a wavelength not longer than 500 nm;
   a collimator lens for collimating the laser beam to parallel rays;
   an optical beam shaping system for adjusting a cross sectional shape of the laser beam from the collimator lens; and
an objective lens for converging the laser beam on an optical information medium,
   wherein a relationship between a focal length $f_{CL}$ of the collimator lens and a magnification M of beam shaping satisfies the following equation, $$6 \geq \left(\frac{C}{f_{CL}}\right)^2 \arcsin\left[\sqrt{\frac{(M-1)}{(n^2M-1)}}\right]$$

wherein C is a constant not smaller than 29 and not greater than 33 in $(\lambda \cdot mm)^{1/2}$, and n is a refractive index of a member of the optical beam shaping system.

2. The optical head according to claim 1, wherein said optical beam shaping system comprises a prism.

3. The optical head according to claim 1, wherein the relationship between the focal length $f_{CL}$ and the magnification M satisfies the following three equations A, B, and C, $$M \cdot f_{CL} \geq \frac{R_{OL}}{\sin\frac{\theta_h}{2}} \sqrt{-\frac{\ln 2}{\ln(I_{rim \cdot h})}} \quad (A)$$

$$f_{CL} \geq \frac{R_{OL}}{\sin\frac{\theta_v}{2}} \sqrt{-\frac{\ln 2}{\ln(I_{rim \cdot v})}} \quad (B)$$

-continued
$$\eta \geq \frac{2}{\pi \cdot R_h R_v} \int\int_s \exp\left[-2\left\{\left(\frac{x}{R_h}\right)^2 + \left(\frac{y}{R_v}\right)^2\right\}\right] dx\,dy \quad (C)$$

wherein M is the magnification of beam shaping prism, $f_{CL}$ is the focal length of the collimator lens, $R_{OL}$ is an effective radius of the objective lens, $\theta_h$ is the angle of F.W.H.M. in the horizontal direction, $I_{rim \cdot h}$ is the rim intensity of the laser beam in the horizontal direction, $\theta_v$ is the angle of F.W.H.M. in the vertical direction, $I_{rim \cdot v}$ is the rim intensity of the beam in the vertical direction, $\eta$ is an efficiency of utilization of the laser beam, and Rh and Rv are $1/e^2$ effective radius of the Gaussian distribution in the horizontal direction and in the vertical direction respectively, and are indicated by the following equations:

$$R_h = \sqrt{\frac{2}{\ln 2}} M \cdot f_{CL} \sin\frac{\theta_h}{2}$$

$$R_v = \sqrt{\frac{2}{\ln 2}} f_{CL} \sin\frac{\theta_v}{2}.$$

4. An optical disc apparatus comprising:
   a laser source for irradiating a laser beam having a wavelength not longer than 500 nm;
   a collimator lens for collimating the laser beam to parallel rays;
   an optical beam shaping system for adjusting a cross sectional shape of the laser beam from the collimator lens;
   an objective lens for converging the laser beam on an optical information medium, an optical detector for outputting optical current due to an optical beam reflected by the surface of the information medium; and
   a signal processor for processing the optical current from the optical detector and for picking up a desired signal,
      wherein a relationship between a focal length $f_{CL}$ of the collimator lens and a magnification M of beam shaping satisfies the following equation, $$6 \geq \left(\frac{C}{f_{CL}}\right)^2 \arcsin\left[\sqrt{\frac{(M-1)}{(n^2M-1)}}\right]$$

wherein C is a constant not smaller than 29 and not greater than 33 in $(\lambda \cdot mm)^{1/2}$, and n is a refractive index of a member of optical beam shaping system.

* * * * *

UNITED STATES PATENT AND TRADEMARK OFFICE
CERTIFICATE OF CORRECTION

| | | |
|---|---|---|
| PATENT NO. | : 7,151,737 B2 | Page 1 of 1 |
| APPLICATION NO. | : 10/891186 | |
| DATED | : December 19, 2006 | |
| INVENTOR(S) | : Daisuke Ogata | |

It is certified that error appears in the above-identified patent and that said Letters Patent is hereby corrected as shown below:

ON THE FRONT PAGE

In section (56) References Cited, under U.S. Patent Documents, right column, line 7, please change "6,876,622 B1" to --6,876,622 B2--.

Signed and Sealed this

First Day of May, 2007

JON W. DUDAS
*Director of the United States Patent and Trademark Office*